US008394880B2

(12) United States Patent
Bauer et al.

(10) Patent No.: US 8,394,880 B2
(45) Date of Patent: *Mar. 12, 2013

(54) FLAME RETARDANT COMPOSITES

(75) Inventors: Ralph Bauer, Niagara Falls (CA); Doruk O. Yener, Wilmington, MA (US)

(73) Assignee: Saint-Gobain Ceramics & Plastics, Inc., Worcester, MA (US)

(*) Notice: Subject to any disclaimer, the term of this patent is extended or adjusted under 35 U.S.C. 154(b) by 329 days.

This patent is subject to a terminal disclaimer.

(21) Appl. No.: 12/399,751

(22) Filed: Mar. 6, 2009

(65) Prior Publication Data
US 2009/0170996 A1 Jul. 2, 2009

Related U.S. Application Data

(60) Division of application No. 10/978,286, filed on Oct. 29, 2004, which is a continuation-in-part of application No. 10/414,590, filed on Apr. 16, 2003, now Pat. No. 7,189,775, and a continuation-in-part of application No. 10/823,400, filed on Apr. 13, 2004, and a continuation-in-part of application No. 10/845,764, filed on May 14, 2004, now abandoned.

(60) Provisional application No. 60/374,014, filed on Apr. 19, 2002.

(51) Int. Cl.
C08K 3/20 (2006.01)
C09K 21/14 (2006.01)
C01F 7/04 (2006.01)

(52) U.S. Cl. ............. 524/437; 524/441; 423/625; 117/6

(58) Field of Classification Search .............. 524/437, 524/441
See application file for complete search history.

(56) References Cited

U.S. PATENT DOCUMENTS

| | | |
|---|---|---|
| 2,763,620 A | 9/1956 | Bugosh |
| 2,915,475 A | 12/1959 | Bugosh |
| 3,056,747 A | 10/1962 | Arthur, Jr. |
| 3,108,888 A | 10/1963 | Bugosh |
| 3,117,944 A | 1/1964 | Harrell |
| 3,136,644 A | 6/1964 | Pangonis |
| 3,202,626 A | 8/1965 | FitzSimmons |
| 3,321,272 A | 5/1967 | Kerr |
| 3,357,791 A | 12/1967 | Napier |
| 3,385,663 A | 5/1968 | Hughes |
| 3,387,447 A | 6/1968 | Trammell et al. |
| 3,790,495 A | 2/1974 | Podschus |
| 3,814,782 A | 6/1974 | Hayes et al. |
| 3,842,111 A | 10/1974 | Meyer-Simon et al. |
| 3,853,688 A | 12/1974 | D'Ambrosio |
| 3,865,917 A | 2/1975 | Galasso et al. |
| 3,873,489 A | 3/1975 | Thurn et al. |
| 3,950,180 A | 4/1976 | Kato |
| 3,978,103 A | 8/1976 | Meyer-Simon et al. |
| 3,997,581 A | 12/1976 | Pletka et al. |
| 4,002,594 A | 1/1977 | Fetterman |
| 4,105,465 A | 8/1978 | Berger |
| 4,117,105 A | 9/1978 | Hertzenberg et al. |
| 4,120,943 A | 10/1978 | Iwaisako et al. |
| 4,344,928 A | 8/1982 | Dupin et al. |
| 4,377,418 A | 3/1983 | Birchall et al. |
| 4,386,185 A | 5/1983 | Macdonell et al. |
| 4,492,682 A | 1/1985 | Trebillon |
| 4,525,494 A | 6/1985 | Andy |
| 4,539,365 A | 9/1985 | Rhee |
| 4,558,102 A | 12/1985 | Miyata |
| 4,623,738 A | 11/1986 | Sugerman et al. |
| 4,632,364 A | 12/1986 | Smith |
| 4,716,029 A | 12/1987 | Oguri et al. |
| 4,769,179 A | 9/1988 | Kato et al. |
| 4,797,139 A | 1/1989 | Bauer |
| 4,835,124 A | 5/1989 | Pearson |
| 4,891,127 A | 1/1990 | Dispenziere et al. |
| 4,946,666 A | 8/1990 | Brown |
| 4,992,199 A | 2/1991 | Meyer et al. |
| 5,155,085 A | 10/1992 | Hamano et al. |
| 5,194,243 A * | 3/1993 | Pearson et al. ............... 423/625 |
| 5,286,290 A | 2/1994 | Risley |
| 5,302,368 A | 4/1994 | Harato et al. |
| 5,306,680 A | 4/1994 | Fukuda |
| 5,318,628 A | 6/1994 | Matijevic et al. |
| 5,321,055 A | 6/1994 | Slocum |
| 5,332,777 A | 7/1994 | Goetz et al. |
| 5,344,489 A | 9/1994 | Matijevic et al. |
| 5,352,835 A | 10/1994 | Dai et al. |
| 5,401,703 A | 3/1995 | Fukuda |
| 5,413,985 A | 5/1995 | Thome et al. |
| 5,445,807 A | 8/1995 | Pearson |
| 5,508,016 A | 4/1996 | Yamanishi et al. |

(Continued)

FOREIGN PATENT DOCUMENTS

| | | |
|---|---|---|
| CN | 1237146 A | 12/1999 |
| CN | 1266020 A | 9/2000 |
| CS | 195426 | 5/1982 |
| DE | 956535 | 1/1957 |
| DE | 2163678 | 7/1973 |
| DE | 2408122 | 8/1974 |
| DE | 2952666 | 7/1980 |
| DE | 199 31 204 | 1/2001 |
| EP | 0038620 A2 | 10/1981 |
| EP | 0015196 | 4/1982 |

(Continued)

OTHER PUBLICATIONS

Thomas J. Martin, Sasol Presentation given on—Functionalized Aluminas, NABALTECH, web page: http://www.nabaltec.de/seiten_d/boehmit_d/anwendungen/news_05_08_98.htm.

(Continued)

Primary Examiner — Tae H Yoon
(74) Attorney, Agent, or Firm — Mike W. Crosby; Abel Law Group, LLP

(57) ABSTRACT

A flame retardant polymer composite is disclosed. The composite includes a polymer base material and a flame retardant filler provided in the polymer base material, the flame retardant filler containing seeded boehmite particulate material having an aspect ratio of not less than 3:1.

11 Claims, 2 Drawing Sheets

U.S. PATENT DOCUMENTS

| | | | |
|---|---|---|---|
| 5,527,851 | A | 6/1996 | Barron et al. |
| 5,550,180 | A | 8/1996 | Elsik et al. |
| 5,580,914 | A | 12/1996 | Falla et al. |
| 5,580,919 | A | 12/1996 | Agostini et al. |
| 5,583,245 | A | 12/1996 | Parker et al. |
| 5,605,750 | A | 2/1997 | Romano et al. |
| 5,656,566 | A | 8/1997 | Ward |
| 5,663,396 | A | 9/1997 | Musleve et al. |
| 5,684,171 | A | 11/1997 | Wideman et al. |
| 5,684,172 | A | 11/1997 | Wideman et al. |
| 5,696,197 | A | 12/1997 | Smith et al. |
| 5,707,716 | A | 1/1998 | Yoshino et al. |
| 5,723,529 | A | 3/1998 | Bernard et al. |
| 5,785,722 | A | 7/1998 | Garg et al. |
| 5,849,827 | A | 12/1998 | Boediger et al. |
| 5,900,449 | A | 5/1999 | Custodero et al. |
| 5,925,592 | A | 7/1999 | Katoh |
| 5,955,142 | A | 9/1999 | Yoshino et al. |
| 5,962,124 | A | 10/1999 | Yoshino et al. |
| 5,989,515 | A | 11/1999 | Watanabe et al. |
| 6,017,632 | A | 1/2000 | Pinnavaia et al. |
| 6,143,816 | A | 11/2000 | Prescher et al. |
| 6,146,770 | A | 11/2000 | Sargeant et al. |
| 6,156,835 | A | 12/2000 | Anderson et al. |
| 6,203,695 | B1 | 3/2001 | Harle et al. |
| 6,280,839 | B1 * | 8/2001 | Brown et al. .............. 428/328 |
| 6,338,891 | B1 | 1/2002 | Kawasaki et al. |
| 6,403,007 | B1 | 6/2002 | Kido et al. |
| 6,413,308 | B1 | 7/2002 | Xu et al. |
| 6,417,286 | B1 | 7/2002 | Agostini et al. |
| 6,420,305 | B1 | 7/2002 | Matsuzawa et al. |
| 6,440,187 | B1 | 8/2002 | Kasai et al. |
| 6,440,552 | B1 | 8/2002 | Kajihara et al. |
| 6,485,656 | B1 | 11/2002 | Meyer et al. |
| 6,486,254 | B1 | 11/2002 | Barbee et al. |
| 6,506,358 | B1 * | 1/2003 | Stamires et al. .............. 423/625 |
| 6,534,584 | B2 | 3/2003 | Wideman et al. |
| 6,555,496 | B1 | 4/2003 | Stamires et al. |
| 6,576,324 | B2 | 6/2003 | Yoshino et al. |
| 6,610,261 | B1 | 8/2003 | Custodero et al. |
| 6,635,700 | B2 | 10/2003 | Cruse et al. |
| 6,646,026 | B2 | 11/2003 | Fan et al. |
| 6,648,959 | B1 | 11/2003 | Fischer et al. |
| 6,653,387 | B2 | 11/2003 | Causa et al. |
| 6,685,999 | B2 | 2/2004 | Ichinose et al. |
| 6,689,432 | B2 | 2/2004 | Kitamura et al. |
| 6,706,660 | B2 | 3/2004 | Park |
| 6,747,087 | B2 | 6/2004 | Custodero et al. |
| 6,841,207 | B2 | 1/2005 | Burch et al. |
| 6,858,665 | B2 | 2/2005 | Larson |
| 6,872,444 | B2 | 3/2005 | McDonald et al. |
| 6,899,930 | B2 | 5/2005 | Kiyama et al. |
| 6,924,011 | B2 | 8/2005 | Van Aert et al. |
| 6,926,875 | B2 | 8/2005 | Hatanaka et al. |
| 6,939,825 | B1 | 9/2005 | Ohno et al. |
| 6,953,554 | B2 | 10/2005 | Wallin et al. |
| 7,056,585 | B2 | 6/2006 | Mishima et al. |
| 7,189,775 | B2 * | 3/2007 | Tang et al. .............. 524/437 |
| 7,211,612 | B2 | 5/2007 | Kikuchi et al. |
| 7,226,647 | B2 | 6/2007 | Kasperchik et al. |
| 7,479,324 | B2 | 1/2009 | Bianchi et al. |
| 7,531,161 | B2 * | 5/2009 | Tang et al. .............. 423/625 |
| 7,863,369 | B2 | 1/2011 | Bianchi et al. |
| 2002/0004549 | A1 | 1/2002 | Custodero et al. |
| 2002/0169243 | A1 | 11/2002 | Nippa |
| 2003/0095905 | A1 | 5/2003 | Scharfe et al. |
| 2003/0185736 | A1 | 10/2003 | Hatanaka et al. |
| 2003/0185739 | A1 | 10/2003 | Mangold et al. |
| 2003/0197300 | A1 | 10/2003 | Tang et al. |
| 2003/0202923 | A1 | 10/2003 | Custodero et al. |
| 2004/0030017 | A1 | 2/2004 | Simonot et al. |
| 2004/0096598 | A1 | 5/2004 | Kasamatsu et al. |
| 2004/0120904 | A1 | 6/2004 | Lye et al. |
| 2004/0166324 | A1 | 8/2004 | Mishima et al. |
| 2004/0265219 | A1 | 12/2004 | Bauer et al. |
| 2005/0124745 | A1 | 6/2005 | Bauer et al. |
| 2005/0146589 | A1 | 7/2005 | Gibbison et al. |
| 2005/0227000 | A1 | 10/2005 | Bauer et al. |
| 2005/0237372 | A1 | 10/2005 | Kondo et al. |
| 2005/0245394 | A1 | 11/2005 | Dahar et al. |
| 2005/0267238 | A1 | 12/2005 | Mutin |
| 2006/0096891 | A1 | 5/2006 | Stamires et al. |
| 2006/0104895 | A1 | 5/2006 | Bauer et al. |
| 2006/0106129 | A1 | 5/2006 | Gernon et al. |
| 2006/0115634 | A1 | 6/2006 | Park et al. |
| 2006/0148955 | A1 | 7/2006 | Guiselin et al. |
| 2006/0182903 | A1 | 8/2006 | Sakaguchi et al. |
| 2007/0104952 | A1 | 5/2007 | Bianchi et al. |
| 2007/0148083 | A1 | 6/2007 | Bauer et al. |
| 2008/0003131 | A1 | 1/2008 | Bauer et al. |
| 2008/0031808 | A1 | 2/2008 | Bauer et al. |

FOREIGN PATENT DOCUMENTS

| | | |
|---|---|---|
| EP | 0108968 A1 | 5/1984 |
| EP | 0304721 A1 | 3/1989 |
| EP | 0563653 A1 | 10/1993 |
| EP | 0667405 A1 | 8/1995 |
| EP | 0501227 B1 | 12/1995 |
| EP | 0735001 A2 | 10/1996 |
| EP | 0736392 A1 | 10/1996 |
| EP | 0885844 A1 | 12/1998 |
| EP | 0896021 A1 | 2/1999 |
| EP | 1225200 A2 | 7/2002 |
| EP | 1256599 A1 | 11/2002 |
| EP | 1323775 A1 | 7/2003 |
| EP | 0697432 B1 | 10/2003 |
| EP | 1000965 B1 | 10/2003 |
| EP | 0807603 B1 | 12/2003 |
| EP | 1112961 B1 | 9/2004 |
| EP | 1645594 A1 | 4/2006 |
| FR | 2927267 A1 | 8/2009 |
| GB | 1022944 | 3/1966 |
| GB | 1189304 | 4/1970 |
| GB | 1360952 A | 7/1974 |
| GB | 2248841 A | 4/1992 |
| HU | 26758 T | 9/1983 |
| JP | 45032530 | 10/1970 |
| JP | 55116622 A | 9/1980 |
| JP | 56009427 A | 1/1981 |
| JP | 58026029 A2 | 2/1983 |
| JP | 58185434 A | 10/1983 |
| JP | 59193949 | 11/1984 |
| JP | 60-046923 | 3/1985 |
| JP | 61-179264 A | 8/1986 |
| JP | H4-78586 A | 9/1986 |
| JP | 62-030133 A | 2/1987 |
| JP | 63147820 A2 | 6/1988 |
| JP | 63147821 A2 | 6/1988 |
| JP | S63-131321 A | 6/1988 |
| JP | 05279019 | 10/1993 |
| JP | 6322243 | 11/1994 |
| JP | 07018174 | 1/1995 |
| JP | 9-99627 A | 4/1997 |
| JP | 09208809 | 8/1997 |
| JP | 09511258 | 11/1997 |
| JP | H9-511258 | 11/1997 |
| JP | 2686833 B2 | 12/1997 |
| JP | 2000-86235 A | 3/2000 |
| JP | 2000239014 | 9/2000 |
| JP | 2001058818 A | 3/2001 |
| JP | 2001-139326 A | 5/2001 |
| JP | 2001180930 | 7/2001 |
| JP | 20010207077 | 7/2001 |
| JP | 2001-240633 A | 9/2001 |
| JP | 2001261976 | 9/2001 |
| JP | 2001-303458 A | 10/2001 |
| JP | 2001-323188 A | 11/2001 |
| JP | 2003002642 | 1/2003 |
| JP | 2003054941 | 2/2003 |
| JP | 2003107206 | 4/2003 |
| JP | 2003238150 | 8/2003 |
| JP | 2003238826 | 8/2003 |
| JP | 2003-313027 A | 11/2003 |
| JP | 2004-001463 A | 1/2004 |
| JP | 200459643 A | 2/2004 |
| JP | 2004051390 A2 | 2/2004 |
| JP | 2004051679 A | 2/2004 |

| | | | |
|---|---|---|---|
| JP | 2004-122784 A | 4/2004 |
| KR | 10-2001-0047270 | 6/2001 |
| KR | 10-1999-0051408 | 1/2002 |
| RU | 2148567 C1 | 5/2000 |
| SU | 267064 A | 7/1970 |
| SU | 501663 | 1/1976 |
| SU | 1444080 A1 | 12/1988 |
| WO | 9511270 | 4/1995 |
| WO | 9723566 | 7/1997 |
| WO | 9814426 | 4/1998 |
| WO | 9935089 A1 | 7/1999 |
| WO | 0188265 A2 | 11/2001 |
| WO | 03/011941 A2 | 2/2003 |
| WO | 03/011941 A3 | 2/2003 |
| WO | 03089508 A1 | 10/2003 |
| WO | 2004016630 A1 | 2/2004 |
| WO | 2004056915 A1 | 7/2004 |
| WO | 2004090023 A1 | 10/2004 |
| WO | 2005100244 A2 | 10/2005 |
| WO | 2005100491 A2 | 10/2005 |
| WO | 2006002993 A1 | 1/2006 |
| WO | 2006049863 A1 | 5/2006 |
| WO | 2006060206 A1 | 6/2006 |
| WO | 2006060468 A3 | 6/2006 |
| WO | 2007056404 A1 | 5/2007 |
| WO | 2009109722 A1 | 9/2009 |

OTHER PUBLICATIONS

Zhu, H. Y., et al., "Growth of Boehmite Nanofibers by Assembling Nanoparticles with Surfactant Micelles", J. Phys. Chem. B., vol. 108, pp. 4245-4247, 2004.
Fisch, H., et al., "Hybrid Materials Based on Polymer Matrices & Organic Components", NTIS, Germany 1994.
Buining et al., J. Am. Ceram. Soc. vol. 74 [6], pp. 1303-1307, 1991.
Anonymous: "High Purity Dispersible Aluminas"; URL:http://www.sasol.com/sasol_internet/downloads/DISPERAL-DISPAL__1055338543391.pdf>abstract; tables 1,2.
Boccaccini A. R. et al; "Alumina Ceramics Based on Seeded Boehmite and Electrophoretic Deposition"; Ceramics International; Elsevier; Amsterdam, NL; vol. 28, No. 8; 2002; pp. 893-897.
Grant et al., "Grant and Hackh's Chemical Dictionary", 5th Ed., (1987), McGraw-Hill Book. Co. USA, ISBN 0-07-024067-1, p. 160.
Zhang, L. et al., "Preparation and Characterization of Nano-fibrous g-Al2O3," Shiyou Huagong, vol. 33, No. 3, pp. 240-243, 2004. Abstract Only.
Zhu, H. et al., "Novel Synthesis of Alumina Oxide Nanofibers," Materials Research Society Symposium Proceedings, vol. 703, pp. 25-30, 2002. Abstract Only.
Zhu, H., et al., "g-Alumina Nanofibers Prepared From Aluminum Hydrate with Poly(ethylene oxide) Surfactant," Chemistry of Materials, vol. 14, No. 5, pp. 2086-2093, 2002. Abstract Only.
Wakayama, H., et al., "Nanoporous Metal Oxides Xynthesized by the Nanoscale Casting Process Using Supercritical Fluids," Chemistry of Materials, vol. 13, No. 7, pp. 2392-2396, 2001. Abstract Only.
Yu, Z. et al., "Preparation of Nanometer-sized Alumina Whiskers," Journal of Materails Research, vol. 13, No. 11, pp. 3017-3018, 1998. Abstract Only.
Kimura, Y., et al., "Synthesis of poly[(acyloxy)aloxane] with carboxyl ligand and its utilization for hte processing of alumina fiber," vol. 20, No. 10, pp. 2329-2334, 1987. Abstract Only.
Podergin, V., et al., "Electron-microscopic study of whiskers formed during pentoxide reduction by alunium," Metaloterm, Protsessy Khim. Met., pp. 44-50, 1972. Abstract Only.
Park, B., et al., "Preparation of High-Capacity Ceramic Catalytic Support from Gibbsite," Han'Guk Seramik Hakhoechi, vol. 39, No. 3, pp. 245-251, 2002. Abstract Only.
Brusasco R., et al., "Preparation and Characterization of Fibrillar Boehmite and g-Aluminum Oxide," Materials Research Bulletin, vol. 19, No. 11, pp. 1489-1496, 1984. Abstract Only.
Kuang, X., et al., "Preparation of Special-shaped g-AlOOH g-Al2O3 Ultrafine Powders by Hydrothermal Reaction Method," Materials and Components for Engines, pp. 594-597, 1994, Abstract Only.
Liu, S., et al., "Synthesis of Novel Nanostructured g-Al2O3 by Pyrolysis of Aluminumoxyhdride-HAlO," Journal of Materials Chemistry, vol. 13, No. 12, pp. 3107-3111, 2003. Abstract Only.

Hicks, R., et al., "Nanoparticle Assembly of Mesoporous AlOOH (Boehmite)," Chemistry of Materials, vol. 15, No. 1, pp. 78-82, 2003. Abstract Only.
Ozuna, O., et al., "Pressure Influenced Combustion Synthesis of Gamma- and Alpha-Al2O3 Nanocrystalline," Journal of Physics-Condensed Matter, vol. 16, No. 15, pp. 2585-2591, 2004. Abstract Only.
McHale, J. et al., "Effects of Increased Surface Area and Chemisorbed H2O on hte Relative Stability of Nanocrystalline Gamma-Al2O3 and Al2O3," Journal of Physical Chemistry, vol. 101, No. 4, pp. 603-613, 1997. Abstract Only.
Kuang, D., et al., "Fabrication of Boehmite AlOOH and Gamma-Al2O3 Nanotubes via a Soft Solution Route," Journal of Materials Chemistry, vol. 13, No. 4, pp. 660-662, 2003. Abstract Only.
Tijburg, I., et al., "Sintering of Pseudo-Boehmite and Gamma-Al2O3," Journal of Materials Science, vol. 26, No. 21, pp. 5945-5949, 1991. Abstract Only.
Wei, Z. et al., "Research for Separation of Precursor in the Preparation Process of Gamma-Al2O3 Ultrafine Powder via Precipitation," Journal of Basic Science and Engineering, vol. 12, pp. 19-23, 2004. Abstract Only.
Singhal, A., "Aluminum Speciation in Aqueous Solutions and Its Effect on Properties of Chemically Synthesized Alumina Powders (Ceramics)," Dissertation Abstracts International, vol. 55, No. 04-B, 1994. Abstract Only.
Kim, S., et al.,"Preparation of High-Temperature Catalytic Support from Gabbsite II. Properties of Amorphous Alumina as Precursor of Catalyst Support," Journal of the Korean Ceramic Society, vol. 33, No. 1, pp. 92-100, 1996. Abstract Only.
Zhang, Z., et al., "Mesostructured Forms of Gamma-A(sub2)O(sub 3)," J. Am. Chemc. Soc., Vo. 124, No. 8, p. 15, ISSN/ISBN: 00027863. Abstract Only.
Llusar, M. et al., "Templated growth of Alumina-based Fibers Through the Use of Anthracenic Organogelators," Chemistry of Materials, vol. 14, No. 12, pp. 5124-5133, 2002. Abstract Only.
Strek, W., et al., "Preparation and Emission Spectra of Eu(III) in Nanostrcutred Gamma-Alumina," Spectrochimica Acta, Part A, vol. 54A, No. 13, pp. 2121-2124, 1997. Abstract Only.
Yogo, T., et al., "Synthesis of Polycrystalline Alumina Fibre with Aluminium Chelate Precursor," Journal of Materials Science, vol. 26, No. 19, pp. 5292-5296, 1999. Abstract Only.
Saraswati, V., et al., "X-ray Diffraction in Gamma-alumina Whiskers," Journal of Crystal Growth, vol. 83, No. 4, pp. 606-609, 1987. Abstract Only.
Zhu, H., et al., "Growth of Boehmite Nanoribers by Assembling Nanoparticles with Surfactant Micelles," Journal of Physical Chemistry, vol. 108, No. 14, pp. 4245-4247, 2006. Abstract Only.
Kamiya, K. et al., "Crystallization Behavior of Sol-Gel-Derived Alumina Fibers. Formation of .Alpha.-alumina Around 500.DEG.C.," Jinko Kessho Toronkai Koen Yoshishu, vol. 41, pp. 9-10, 1996. Abstract Only.
Iucuta, P., et al., "Phase Evolution in Al2O3 Fibre Prepared From an Oxychloride Precursor," Journal of Materials Science, vol. 27, No. 22, pp. 6053-6061, 1992. Abstract Only.
"Halogenated Polyolefin" Thermoplastic Elastomers Properties and Applications; Rapra Review Reports; vol. 7, pp. 17-18, 1995.
L.A. Blank et al., "Modification of fillers for Ftorlon-4 with microfibrous boehmite", Sov. Plast., 1972, 2, 66-67.
Paul A. Buining et al., "Preparation on (non-)aqueous dispersions of colloidal boehmite needles", Chemical Engineering Science, 48(2), 411-417, 1993.
Johann Buitenhuis et al., "Phase separation of mixtures of colloidal boehmite rods and flexible polymer," Journal of Colloid and Interface Science, 1995, 175, 46-56.
V.G. Fitzsimmons, W.A. Zisman, "Microfiber reinforcement of polytetrafluoroethylene", Modern Plastics, 1963, 40 (5), 151-154, 158, 160-162, 238-241.
John Bugosh et al., "A Novel fine alumina powder, fibrillar boehmite", I&EC Product Research and Development, vol. 1, No. 3, Sep. 1962.
P.A. Buining et al., "Preparation and properties of dispersions of colloidal boehmite rods", Progr Colloid Polym Sci 93:10-11 (1993).

Sridhar Komarneni, "Nanocomposites", J. Mater. Chem., 1992, 2(12), 1219-1230.

S. Furuta et al., "Preparation and properties of fibrous boehmite sol and its application for thin porous membrane", Journal of Materials Science Letters 13 (1994) 1077-1080.

B.S. Gevert and Zhong-Shu Ying, "Formation of fibrillar boehmite", Journal of Porous Materials, 6, 63-67 (1999).

M.P.B. Van Bruggen, "Preparation and properties of colloidal core-shell rods with adjustable aspect ratios", Langmuir 1998, 14, 2245-2255.

John Bugosh, "Colloidal alumina—the chemistry and morphology of colloidal boehmite", J. Phys. Chem., 1961, 65 (10), pp. 1789-1793.

Paul A. Buining et al., "Effect of hydrothermal conditions on the morphology of colloidal boehmite particles: Implications for fibril formation and monodispersity", J. Am. Ceram. Soc., 1990, 73[8] 2385-90.

N. G. Papayannakos et al., "Effect of seeding during precursor preparation on the pore structure of alumina catalyst supports," Microporous Materials, Oct. 19, 1993, vol. 1, No. 6, pp. 413-422.

C. Skoufadis et al., "Kinetics of boehmite precipitation from supersturated sodium aluminate solutions," Hydrometallurgy, Feb. 2003, vol. 68, No. 1-3, pp. 57-68.

D. Panias, "Role of boehmite/solution interface in boehmite precipitation from supersaturated sodium aluminate solutions," Hydrometallurgy, Oct. 2004, vol. 74, No. 3-4, pp. 203-212.

Accuratus, Zirconium Oxide, Feb. 24, 2006, http://replay.waybackmachine.org/20060224140049/www.accuratus.com/zirc.html.

Yeung et al, Mesoporous alumina membranes: Synthesis, characterization, thermal stability and nonuniform distribution of catalyst, 1997, Journal of Membrane Science, 131, pp. 9-28.

Baxter et al., "Surface Modified Aluminas as Organic Nanodispersions", SASOL North America Inc., 11 pages, Date Unknown.

Etchells, Davd, "A 'Universal' Inkjet Paper," http://www.imaging-resource.com/ARTS/IJPAPER/IJPAPER1.HTM, Nov. 20, 2007, posted Apr. 24, 2000, 6 pgs.

Schaber et al., "Study of the urea thermal decompositon (pyolysis) reaction and importance to cyanuric acid production" American Laboratory, 1999, pp. 13-21.

Ross "A new mineral flame retardant with increased thermal stability" http://www.nabaltec.de/seiten_d/boehmit_d/anwendungen/news_05_08_98.htm. Accessed: Mar. 2, 2004. 10 pages.

Alexander, K. et al., "Grain Growth Kinetics in Alumina-Zirconia (CeZTA) Composites," J. Am. Ceram. Soc., vol. 77, No. 4, pp. 939-946, 1994.

Cuneyt Tas, A., "Chemical Peparaton of the Binary Compounds in the Calcia-Aiurina Systems by Self-Propagating Combustion Synthesis," J. Am. Ceram. Soc., vol. 81, No. 11, pp. 2853-2863, 1998.

Okada, K. et al., "Effect of Divalent Cation Additives on the gamma-Al2O3-to-Al2O3 Phase Transition," J. Am. Ceram. Soc., vol. 83, No. 4, pp. 928-932, 2000.

Tsai, D., et al., "Controlled Gelation and Sintering of Monolithic Gels Prepared from gamma-Alumina Fume Powder," J. Am. Ceram. Soc., vol. 74, No. 4, pp. 830-836, 1991.

* cited by examiner

FLAME RETARDANT COMPOSITES

CROSS-REFERENCE TO RELATED APPLICATION(S)

This application is a Divisional of 10/978,286, filed Oct. 29, 2004, which in turn is (i) a continuation-in-part application of U.S. patent application Ser. No. 10/414,590, filed Apr. 16, 2003, now U.S. Pat. No. 7,189,775, which in turn is a non-provisional application of U.S. Provisional Application 60/374,014 filed Apr. 19, 2002, and (ii) a continuation-in-part application of U.S. patent application Ser. No. 10/823,400, filed Apr. 13, 2004, and (iii) a continuation-in-part of U.S. patent application Ser. No. 10/845,764, filed May 14, 2004, now abandoned. Priority to the foregoing applications is hereby claimed, and the subject matter thereof hereby incorporated by reference.

BACKGROUND

1. Field of the Invention

The present invention is generally directed to flame retardant composites, and more particularly to flame retardant composites that include a polymer base material and a flame retardant filler to improve flame retardancy.

2. Description of the Related Art

With rapid improvement in technology over the past decades, increasing demand has been created for high performance materials, including ceramics, metals and polymers for a myriad of applications. For example, in the context of microelectronic devices, market pressures dictate smaller, faster and more sophisticated end products, which occupy less volume and operate at higher current densities. These higher current densities further increase heat generation and, often, operating temperatures. In this context, it has become increasingly important for safety concerns to implement microelectronic packaging materials that provide exemplary flame resistance. Use of flame resistant packaging materials is but one example among many in which product designers have specified use of flame resistant materials. For example, flame resistant thermoplastic polymers are in demand as construction materials.

In addition, governmental regulatory bodies have also sought flame resistant materials in certain applications to meet ever-increasing safety concerns. Accordingly, the industry has continued to demand improved composite materials, for example, improved polymer-based materials that have desirable flame retardant characteristics.

SUMMARY

According to an aspect of the present invention, a flame retardant polymer composite is provided. The composite includes a polymer base material and a flame retardant filler provided in the polymer base material, the flame retardant filler containing seeded boehmite particulate material having an aspect ratio of not less than 2:1, typically not less than 3:1.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
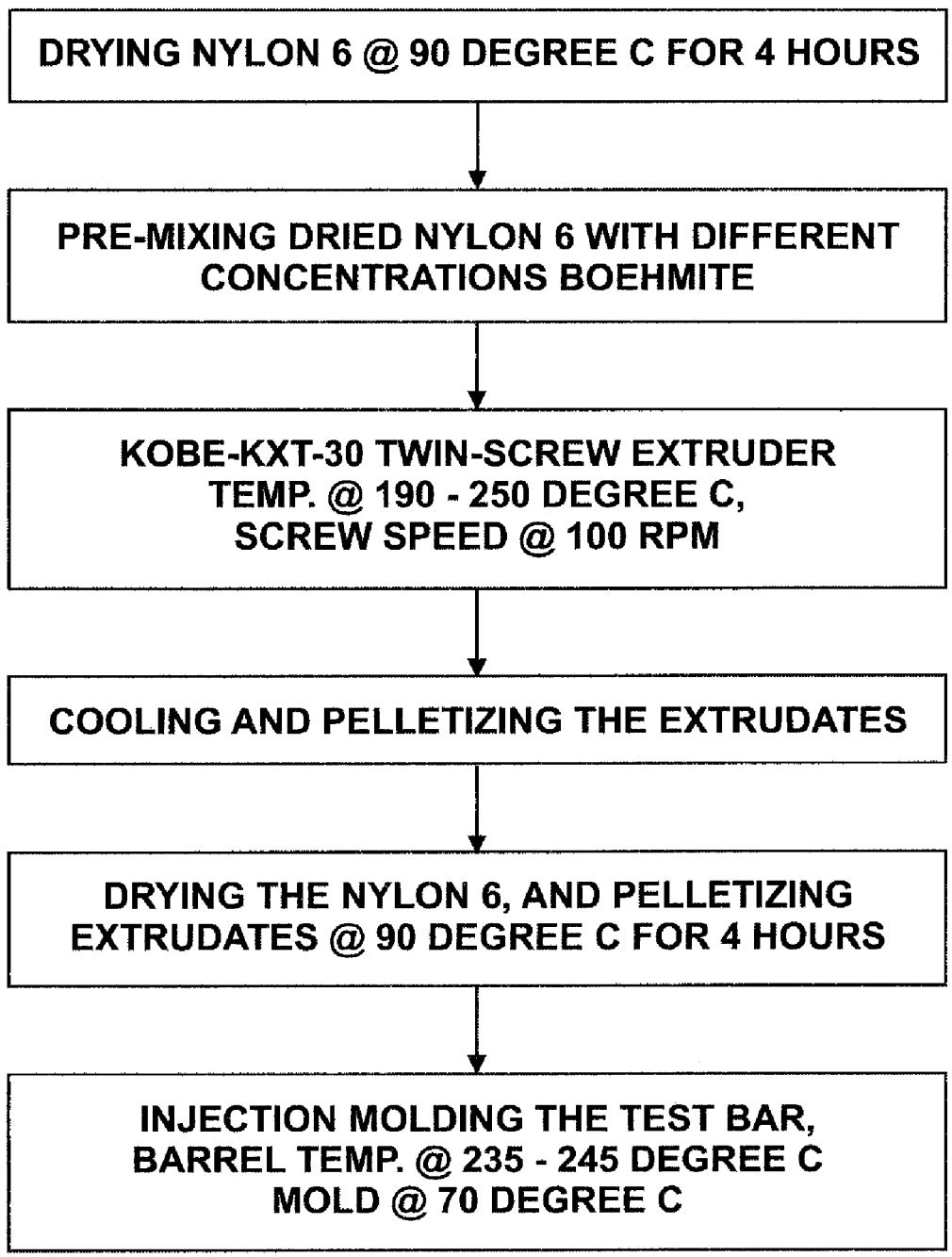
FIG. 1 illustrates a process flow for forming a polymer composite according to an embodiment of the present invention.

According to one aspect of the present invention, a flame retardant polymer composite is provided, which includes a polymer base material and a flame retardant filler. Notably the flame retardant filler includes a seeded boehmite particulate material having an aspect ratio of not less than about 3:1. Typically, the polymer based material is a material that has commercial significance and demand in industry, but oftentimes does not exhibit native flame retardant properties. Quantitatively, flame retardancy may be measured according to underwriter laboratories test UL 94, the so called vertical burn test. The UL 94 test is carried out by ASTM D635 standards, and materials are given a V rating based upon several observed characteristics including flame time, glow time, extent of burning, as well as the ability of the sample to ignite cotton. Typically, the polymer based materials of interest and in need of flame retardant characteristics have a UL 94 rating of V-2 or above, indicating volatility under certain conditions. Additional features of the polymer base material according to embodiments of the present invention are discussed below. First, we turn to the flame retardant filler, particularly, the seeded boehmite particulate material according to embodiments of the present invention that contributes to significant improvement in flame retardancy.

According to a particular feature, the seeded boehmite particulate material is utilized rather than boehmite derived from non-seeded processing pathways, including non-seeded hydrothermal treatment and precipitation pathways. As discussed in more detail below, embodiments of the present invention have demonstrated exemplary flame retardancy, even without relying on additional flame retardant components to improve performance.

Seeded boehmite particulate material is generally formed by a process that includes providing a boehmite precursor and boehmite seeds in a suspension, and heat treating (such as by hydrothermal treatment) the suspension (alternatively sol or slurry) to convert the boehmite precursor into boehmite particulate material formed of particles or crystallites. According to a particular aspect, the boehmite particulate material has a relatively elongated morphology, described generally herein in terms of aspect ratio, described below.

The term "boehmite" is generally used herein to denote alumina hydrates including mineral boehmite, typically being $Al_2O_3 \cdot H_2O$ and having a water content on the order of 15%, as well as psuedoboehmite, having a water content higher than 15%, such as 20-38% by weight. It is noted that boehmite (including psuedoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

The aspect ratio, defined as the ratio of the longest dimension to the next longest dimension perpendicular to the longest dimension, is generally not less than 2:1, and preferably not less than 3:1, 4:1, or 6:1. Indeed, certain embodiments have relatively elongated particles, such as not less than 9:1, 10:1, and in some cases, not less than 14:1. With particular reference to needle-shaped particles, the particles may be further characterized with reference to a secondary aspect ratio defined as the ratio of the second longest dimension to the third longest dimension. The secondary aspect ratio is generally not greater than 3:1, typically not greater than 2:1, or even 1.5:1, and oftentimes about 1:1. The secondary aspect ratio generally describes the cross-sectional geometry of the particles in a plane perpendicular to the longest dimension.

Platey or platelet-shaped particles generally have an elongated structure having the aspect ratios described above in connection with the needle-shaped particles. However, platelet-shaped particles generally have opposite major surfaces, the opposite major surfaces being generally planar and generally parallel to each other. In addition, the platelet-shaped particles may be characterized as having a secondary aspect ratio greater than that of needle-shaped particles, generally not less than about 3:1, such as not less than about 6:1, or even not less than 10:1. Typically, the shortest dimension or edge dimension, perpendicular to the opposite major surfaces or faces, is generally less than 50 nanometers.

Morphology of the seeded boehmite particulate material may be further defined in terms of particle size, more particularly, average particle size. Here, the seeded boehmite particulate material, that is, boehmite formed through a seeding process (described in more detail below) has a relatively fine particle or crystallite size. Generally, the average particle size is not greater than about 1000 nanometers, and fall within a range of about 100 to 1000 nanometers. Other embodiments have even finer average particle sizes, such as not greater than about 800 nanometers, 600 nanometers, 500 nanometers, 400 nanometers, and even particles having an average particle size smaller than 300 nanometers, representing a fine particulate material. In certain embodiments, the average particle size was less than 200 nanometers, such as within a range of about 100 nanometers to about 150 nanometers.

As used herein, the "average particle size" is used to denote the average longest or length dimension of the particles. Due to the elongated morphology of the particles, conventional characterization technology is generally inadequate to measure average particle size, since characterization technology is generally based upon an assumption that the particles are spherical or near-spherical. Accordingly, average particle size was determined by taking multiple representative samples and physically measuring the particle sizes found in representative samples. Such samples may be taken by various characterization techniques, such as by scanning electron microscopy (SEM).

The present seeded boehmite particulate material has been found to have a fine average particle size, while oftentimes competing non-seeded based technologies are generally incapable of providing such fine average particle sizes in the context of anisotropic particles. In this regard, it is noted that oftentimes in the literature, reported particle sizes are not set forth in the context of averages as in the present specification, but rather, in the context of nominal range of particle sizes derived from physical inspection of samples of the particulate material. Accordingly, the average particle size will lie within the reported range in the prior art, generally at about the arithmetic midpoint of the reported range, for the expected Gaussian particle size distribution. Stated alternatively, while non-seeded based technologies may report fine particle size, such fine sizing generally denotes the lower limit of an observed particle size distribution and not average particle size.

Likewise, in a similar manner, the above-reported aspect ratios generally correspond to the average aspect ratio taken from representative sampling, rather than upper or lower limits associated with the aspect ratios of the particulate material.

Oftentimes in the literature, reported particle aspect ratios are not set forth in the context of averages as in the present specification, but rather, in the context of nominal range of aspect ratios derived from physical inspection of samples of the particulate material. Accordingly, the average aspect ratio will lie within the reported range in the prior art, generally at about the arithmetic midpoint of the reported range, for the expected Gaussian particle morphology distribution. Stated alternatively, while non-seeded based technologies may report aspect ratio, such data generally denotes the lower limit of an observed aspect ratio distribution and not average aspect ratio.

In addition to aspect ratio and average particle size of the particulate material, morphology of the particulate material may be further characterized in terms of specific surface area. Here, the commonly available BET technique was utilized to measure specific surface area of the particulate material. According to embodiments herein, the boehmite particulate material has a relatively high specific surface area, generally not less than about 10 $m^2/g$, such as not less than about 50 $m^2/g$, 70 $m^2/g$, or not less than about 90 $m^2/g$. Since specific surface area is a function of particle morphology as well as particle size, generally the specific surface area of embodiments was less than about 400 $m^2/g$, such as less than about 350 or 300 $m^2/g$.

Turning to the details of the processes by which the boehmite particulate material may be manufactured, generally ellipsoid, needle, or platelet-shaped boehmite particles are formed from a boehmite precursor, typically an aluminous material including bauxitic minerals, by hydrothermal treatment as generally described in the commonly owned patent described above, U.S. Pat. No. 4,797,139. More specifically, the boehmite particulate material may be formed by combining the boehmite precursor and boehmite seeds in suspension, exposing the suspension (alternatively sol or slurry) to heat treatment to cause conversion of the raw material into boehmite particulate material, further influenced by the boehmite seeds provided in suspension. Heating is generally carried out in an autogenous environment, that is, in an autoclave, such that an elevated pressure is generated during processing. The pH of the suspension is generally selected from a value of less than 7 or greater than 8, and the boehmite seed material has a particle size finer than about 0.5 microns. Generally, the seed particles are present in an amount greater than about 1% by weight of the boehmite precursor (calculated as $Al_2O_3$), and heating is carried out at a temperature greater than about 120° C., such as greater than about 125° C., or even greater than about 130° C., and at a pressure greater than about 85 psi, such as greater than about 90 psi, 100 psi, or even greater than about 110 psi.

The particulate material may be fabricated with extended hydrothermal conditions combined with relatively low seeding levels and acidic pH, resulting in preferential growth of boehmite along one axis or two axes. Longer hydrothermal treatment may be used to produce even longer and higher aspect ratio of the boehmite particles and/or larger particles in general.

Following heat treatment, such as by hydrothermal treatment, and boehmite conversion, the liquid content is generally removed, such as through an ultrafiltration process or by heat treatment to evaporate the remaining liquid. Thereafter, the resulting mass is generally crushed, such to 100 mesh. It is noted that the particulate size described herein generally describes the single crystallites formed through processing, rather than the aggregates which may remain in certain embodiments (e.g., for those products that call for and aggregated material).

According to data gathered by the present inventors, several variables may be modified during the processing of the boehmite raw material, to effect the desired morphology. These variables notably include the weight ratio, that is, the ratio of boehmite precursor to boehmite seed, the particular type or species of acid or base used during processing (as well as the relative pH level), and the temperature (which is directly proportional to pressure in an autogenous hydrothermal environment) of the system.

In particular, when the weight ratio is modified while holding the other variables constant, the shape and size of the particles forming the boehmite particulate material are modified. For example, when processing is carried at 180° C. for two hours in a 2 weight % nitric acid solution, a 90:10 ATH: boehmite seed ratio forms needle-shaped particles (ATH being a species of boehmite precursor). In contrast, when the ATH:boehmite seed ratio is reduced to a value of 80:20, the particles become more elliptically shaped. Still further, when the ratio is further reduced to 60:40, the particles become near-spherical. Accordingly, most typically the ratio of boehmite precursor to boehmite seeds is not less than about 60:40, such as not less than about 70:30 or 80:20. However, to ensure adequate seeding levels to promote the fine particulate morphology that is desired, the weight ratio of boehmite precursor to boehmite seeds is generally not greater than about 99:1, or 98:2. Based on the foregoing, an increase in weight ratio generally increases aspect ratio, while a decrease in weight ratio generally decreased aspect ratio.

Further, when the type of acid or base is modified, holding the other variables constant, the shape (e.g., aspect ratio) and size of the particles are affected. For example, when processing is carried out at 100° C. for two hours with an ATH: boehmite seed ratio of 90:10 in a 2 weight % nitric acid solution, the synthesized particles are generally needle-shaped, in contrast, when the acid is substituted with HCl at a content of 1 weight % or less, the synthesized particles are generally near spherical. When 2 weight % or higher of HCl is utilized, the synthesized particles become generally needle-shaped. At 1 weight % formic acid, the synthesized particles are platelet-shaped. Further, with use of a basic solution, such as 1 weight % KOH, the synthesized particles are platelet-shaped. If a mixture of acids and bases is utilized, such as 1 weight % KOH and 0.7 weight % nitric acid, the morphology of the synthesized particles is platelet-shaped.

Suitable acids and bases include mineral acids such as nitric acid, organic acids such as formic acid, halogen acids such as hydrochloric acid, and acidic salts such as aluminum nitrate and magnesium sulfate. Effective bases include, for example, amines including ammonia, alkali hydroxides such as potassium hydroxide, alkaline hydroxides such as calcium hydroxide, and basic salts.

Still further, when temperature is modified while holding other variables constant, typically changes are manifested in particle size. For example, when processing is carried out at an ATH:boehmite seed ratio of 90:10 in a 2 weight % nitric acid solution at 150° C. for two hours, the crystalline size from XRD (x-ray diffraction characterization) was found to be 115 Angstroms. However, at 160° C. the average particle size was found to be 143 Angstroms. Accordingly, as temperature is increased, particle size is also increased, representing a directly proportional relationship between particle size and temperature.

The following examples focus on seeded boehmite synthesis.

Example 1

Plate-Shaped Particle Synthesis

An autoclave was charged with 7.42 lb. of Hydral 710 aluminum trihydroxide purchased from Alcoa; 0.82 lb of boehmite obtained from SASOL under the name—Catapal B pseudoboehmite; 66.5 lb of deionized water; 0.037 lb potassium hydroxide; and 0.18 lb of 22 wt % nitric acid. The boehmite was pre-dispersed in 5 lb of the water and 0.18 lb of the acid before adding to the aluminum trihydroxide and the remaining water and potassium hydroxide.

The autoclave was heated to 185° C. over a 45 minute period and maintained at that temperature for 2 hours with stirring at 530 rpm. An autogenously generated pressure of about 163 psi was reached and maintained. Thereafter the boehmite dispersion was removed from the autoclave. After autoclave the pH of the sol was about 10. The liquid content was removed at a temperature of 65° C. The resultant mass was crushed to less than 100 mesh. The SSA of the resultant powder was about 62 $m^2/g$. Average particle size (length) was within a range of about 150 to 200 nm according to SEM image analysis.

Example 2

Needle-Shaped Particle Synthesis

An autoclave was charged with 250 g of Hydral 710 aluminum trihydroxide purchased from Alcoa; 25 g of boehmite obtained from SASOL under the name—Catapal B pseudoboehmite; 1000 g of deionized water; and 34.7 g of 18% nitric acid. The boehmite was pre-dispersed in 100 g of the water and 6.9 g of the acid before adding to the aluminum trihydroxide and the remaining water and acid.

The autoclave was heated to 180° C. over a 45 minute period and maintained at that temperature for 2 hours with stirring at 530 rpm. An autogenously generated pressure of about 150 psi was reached and maintained. Thereafter the boehmite dispersion was removed from the autoclave. After autoclave the pH of the sol was about 3. The liquid content was removed at a temperature of 95° C. The resultant mass was crushed to less than 100 mesh. The SSA of the resultant powder was about 120 $m^2/g$. Average particle size (length) was within a range of about 150 to 200 nm according to SEM image analysis Example 3

Ellipsoid Shaped Particle Synthesis

An autoclave was charged with 220 g of Hydral 710 aluminum trihydroxide purchased from Alcoa; 55 g of boehmite obtained from SASOL under the name—Catapal B pseudoboehmite; 1000 g of deionized water; and 21.4 g of 18% nitric acid. The boehmite was pre-dispersed in 100 g of the water and 15.3 g of the acid before adding to the aluminum trihydroxide and the remaining water and acid.

The autoclave was heated to 172° C. over a 45 minute period and maintained at that temperature for 3 hours with stirring at 530 rpm. An autogenously generated pressure of about 120 psi was reached and maintained. Thereafter the boehmite dispersion was removed from the autoclave. After autoclave the pH of the sol was about 4. The liquid content was removed at a temperature of 95° C. The resultant mass was crushed to less than 100 mesh. The SSA of the resultant powder was about 135 m²/g. Average particle size (length) was within a range of about 150 to 200 nm according to SEM image analysis Example 4

Near Spherical Particle Synthesis

An autoclave was charged with 165 g of Hydral 710 aluminum trihydroxide purchased from Alcoa; 110 g of boehmite obtained from SASOL under the name—Catapal B pseudoboehmite; 1000 g of deionized water; and 35.2 g of 18% nitric acid. The boehmite was pre-dispersed in 100 g of the water and 30.6 g of the acid before adding to the aluminum trihydroxide and the remaining water and acid.

The autoclave was heated to 160° C. over a 45 minute period and maintained at that temperature for 2.5 hours with stirring at 530 rpm. An autogenously generated pressure of about 100 psi was reached and maintained. Thereafter the boehmite dispersion was removed from the autoclave. After autoclave the pH of the sol was about 3.5. The liquid content was removed at a temperature of 95° C. The resultant mass was crushed to less than 100 mesh. The SSA of the resultant powder was about 196 m²/g.

Turning to the polymer base material of the composite, the material may be formed of polymers including elastomeric materials, such as polyolefins, polyesters, fluoropolymers, polyamides, polyimides, polycarbonates, polymers containing styrene, epoxy resins, polyurethane, polyphenol, silicone, or combinations thereof. In one exemplary embodiment, the polymer composite is formed of silicone, silicone elastomer, and silicone gels. Silicone, silicone elastomer, and silicone gels may be formed using various organosiloxane monomers having functional groups such as alkyl groups, phenyl groups, vinyl groups, glycidoxy groups, and methacryloxy groups and catalyzed using platinum-based or peroxide catalyst. Exemplary silicones may include vinylpolydimethylsiloxane, polyethyltriepoxysilane, dimethyl hydrogen siloxane, or combinations thereof. Further examples include aliphatic, aromatic, ester, ether, and epoxy substituted siloxanes. In one particular embodiment, the polymer composite comprises vinylpolydimethylsiloxane. In another particular embodiment, the polymer composite comprises dimethyl hydrogen siloxane. Silicone gels are of particular interest for tackiness and may be formed with addition of a diluent.

Aspects of the present invention are particularly useful for polymer base materials that do not have a native, robust flame retardancy, such as those polymers that have a flame retardancy of V-2 or greater. For example, Nylon 6, noted below, has been characterized as having a native flame retardancy of V-2. Accordingly, as a subset of polymers that benefit from flame retardancy additives according to aspects of the present invention include: non-chlorinated polymers, non-fluorinated polymers, and may be selected from the group consisting of polyolefins, polyesters, polyamides, polyimides, polycarbonates, polymers containing styrene, epoxy resins, polyurethane, polyphenol, and combinations thereof.

The polymer composite may comprise at least about 0.5 to about 50 wt % boehmite particulate material, such as about 2 to about 30 wt %. According to one feature, exemplary flame retardancy may be achieved even a low loadings, such as within a range of about 2 to 15 wt % of the total composite.

Oftentimes the composite material is in the form of a component (cured form), and may find practical use as a polymer structural component such as a construction material. Typically, the polymer base material is combined with the boehmite filler material to form the composite, such as by mixing the components and, in the case of structural components, followed shape forming. Shape forming would not be required in the case of coating compositions.

Turning to FIG. 1, a process for forming a polymer component in which a polymer base component is combined with boehmite. In the particular process flow, a molded polymer component is formed by injection molding. FIG. 1 details the process flow for nylon 6-based polymer component that may take on various contours and geometric configurations for the particular end use. As described, nylon-6 raw material is first dried, followed by premixing with boehmite under various loading levels. The premixed nylon-boehmite is then extruded to form pelletized extrudates, which are then cooled and dried. The final article is then formed by injection molding, the pelletized extrudates providing the feedstock material for the molding process. The particular geometric configuration may vary widely depending upon the end use, but here, flat bars were extruded that were then used as test samples for flame retardancy.

Following the foregoing process flow, two different filler loading levels were selected for flame retardancy testing, 3 wt. % and 5 wt. % of needle shaped (alternatively referred to as whisker or rod-shaped) fine boehmite. The samples were tested according to UL 94V, utilizing the classifying criteria below in Table 1.

TABLE 1

| | Criteria Conditions | | |
|---|---|---|---|
| | 94V-0 | 94V-1 | 94V-2 |
| Flame time, T1 or T2 | $\leq$10 s | $\leq$30 s | $\leq$30 s |
| Flame Time, T1 + T2 | $\leq$50 s | $\leq$250 s | $\leq$250 s |
| Glow Time, T3 | $\leq$30 s | $\leq$60 s | $\leq$60 s |
| Did sample burn to holding clamp? yes/no | No | No | No |
| Did sample ignite cotton? Yes/no | No | No | Yes |

As a result of testing, both the 3 wt. % and 5 wt. % loading levels provided the highly desirable V-0 rating. Such exemplary flame retardancy is notable, for various reasons. For example, the V-0 rating was achieved at very moderate loading levels, and without inclusion of additional flame retardant fillers. It should be noted, however, that additional fillers may be incorporated in certain embodiments to achieve additional flame retardancy, although the particular seeded boehmite material described above provides a marked improvement in flame retardancy without relying upon additional fillers.

The above-reported flame retardancy takes on even additional significance when compared to the state of the art. For example, other reports have been provided in which fine boehmite material has only been able to provide limited flame retardancy, and not V-0 as reported herein. However, the boehmite additives utilized in these other reports is generally not a seeded boehmite, and is formed through a non-seeded process, including non-seeded hydrothermal processing pathways, or by precipitation. While not wishing to be bound by any particular theory, it is believed that the seeded processing pathway contributes to the exemplary flame retardancy reported herein. One possible explanation for this is that the seeded boehmite material has unique morphological features, perhaps even beyond the morphologies described above in connection with primary and secondary aspect ratios forming elongated platelet and needle-shaped particulates. However, it is additionally believed that the high aspect ratio morphologies enabled by seeded processing pathway may also further contribute to the exemplary flame retardancy. The high aspect ratio particles may provide a serpentine or tortuous pathway for oxygen migration, thereby inhibiting flame propagation due to reduced oxygen migration to the flame front or area.

Figure 2:
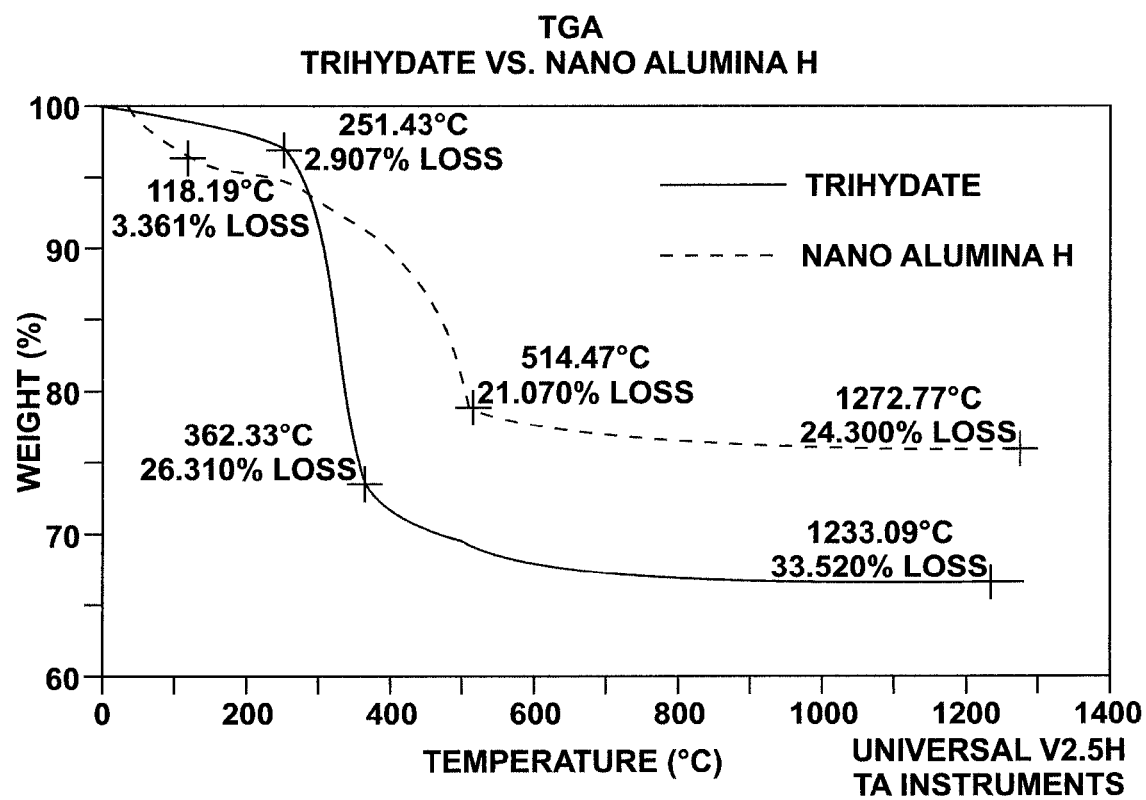
FIG. 2 illustrates a thermogravimetric analysis (TGA) of seeded boehmite vs. conventional ATH.

Turning to FIG. 2, the results of thermogravimetric analysis (TGA) are reported for whisker (needle) shaped boehmite, as compared to conventional ATH. As shown, the needle-shaped boehmite particulate material loses crystalline (as opposed to adsorbed or absorbed) water at lower temperatures and continues losing water at temperatures above ATH, extending into the 500° C. range. The dynamics associated with water loss associated with the seeded boehmite particulate material may also partially explain the flame retardancy characteristics reported herein.

While the foregoing has focused on polymer composite components, such as structural components, it is also noted that the polymer composite may also be in the form of a surface coating solution, such as a polymer-containing paint formulation. Of course, like the polymer component described above, the flame retardancy characteristics are generally associated with the cured material. Accordingly, in the case of surface coating solutions, flame retardancy is associated with the cured, dried coating. For additional details of surface coating solutions, the reader is directed to co-pending U.S. patent application Ser. No. 10/823,400, filed Apr. 13, 2004, incorporated herein by reference.

According to a further aspect of the invention, the flame retardant filler may also be in the form of a blend of flame retardant components, including iron oxide, and a vitrifying component, such as metal borates, preferably zinc borate, along with the seeded boehmite particulate material described in detail above. Conventional ATH may also be incorporated. Other filler may include materials such as glass fibers, nano-clays, alumina (e.g., submicron alpha alumina), and carbon.

The polymer composite may further include thermally conductive fillers, such as alumina and boron nitride. As a result, the composite may have a thermal conductivity not less than about 0.5 W/m·K, such as not less than 1.0 W/m·K or not less than 2.0 W/m·K, particularly suitable for applications requiring a thermal transfer performance, such as a thermal interface material used in microelectronic applications.

While the invention has been illustrated and described in the context of specific embodiments, it is not intended to be limited to the details shown, since various modifications and substitutions can be made without departing in any way from the scope of the present invention. For example, additional or equivalent substitutes can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is:

1. A method of forming a flame retardant polymer composite, comprising:
    providing a boehmite precursor material and boehmite seeds in a suspension;
    heat treating the suspension at a temperature greater than 120° C. to convert the boehmite precursor material into a flame retardant filler comprising boehmite particulate material having an average particle size within a range of about 100 and 300 nm, a specific surface area of not less than 50 m$^2$/g and not greater than 400 m$^2$/g, and a primary aspect ratio of not less than 3:1, wherein the boehmite particulate material predominantly comprises platelet-shaped particles, having a secondary aspect ratio of not less than 3:1; and
    combining the flame retardant filler with a polymer base material to form the flame retardant polymer composite, wherein the composite comprises about 2.0 to 15.0 wt% flame retardant filler.

2. The method of claim 1, further including shape forming following combining, the flame retardant composite being a polymer component.

3. The method of claim 1, wherein the flame retardant composite is a surface coating solution.

4. The method of claim 1, wherein the composite has a flame retardancy of V-0 or V-1 according to UL94.

5. The method of claim 4, wherein the composite has a flame retardancy of V-0.

6. The method of claim 1, wherein the polymer base material has a flame retardancy of V-2 or higher, the filler functioning to improve the flame retardancy of the composite to V-1 or V-0 according to UL 94.

7. The method of claim 1, wherein the polymer base material is selected from the group consisting of polyolefins, polyesters, fluoropolymers, polyamides, polyimides, polycarbonates, polymers containing styrene, epoxy resins, polyurethane, polyphenol, silicone, and combinations thereof.

8. The method of claim 7, wherein the polymer base material is a non-chlorinated polymer and is a non-fluorinated polymer, and is selected from the group consisting of polyolefins, polyesters, polyamides, polyimides, polycarbonates, polymers containing styrene, epoxy resins, polyurethane, polyphenol, and combinations thereof.

9. The method of claim 1, wherein the seeded boehmite particulate material has the primary aspect ratio of not less than 4:1.

10. The method of claim 1, wherein the seeded boehmite particulate material has the primary aspect ratio of not less than 6:1.

11. The method of claim 1, wherein heat treating the suspension occurs at a pH greater than 8 and the boehmite particulate produced comprises particles having an edge dimension less than 50 nanometers.

* * * * *